Figure 1:
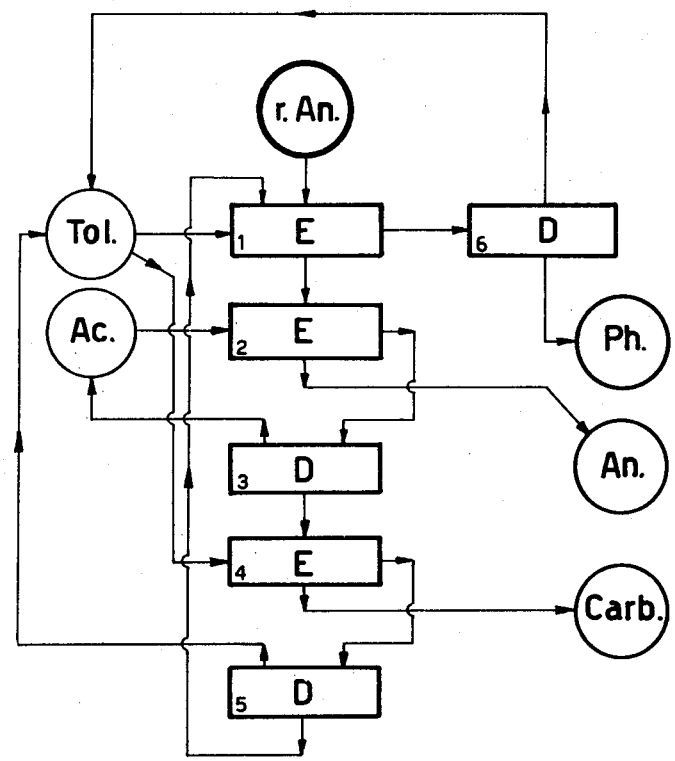

United States Patent Office 2,764,595
Patented Sept. 25, 1956

2,764,595
PROCESS FOR THE PREPARATION OF TECHNICALLY PURE ANTHRACENE AND CARBAZOLE FROM CRUDE ANTHRACENE

Frans P. K. De Jong, Geleen, Netherlands, assignor to Stamicarbon N. V., Heerlen, Netherlands Application May 13, 1953, Serial No. 354,698

3 Claims. (Cl. 260—318)

My invention relates to a process for the preparation of technically pure anthracene and carbazole from crude anthracene obtained by crystallisation and separation from the anthracene oil fraction in tar distillation. The product obtained from anthracene oil by cooling and centrifuging contains about 25% of anthracene, 25% of carbazole, 38% of phenanthrene and 10% of oil and other constituents. By recrystallisation from naphthalene oil this product may be worked up into a substance containing 40% of anthracene, 38% of carbazole, 12% of phenanthrene and 10% of oil and other constituents.

In the production of anthracene and carbazole from the crude products use is often made of the difference in solubility of these substances in various solvents. The employment of pyridine and furan derivatives is already known and it has also been proposed to prepare technically pure anthracene from the crude crystallised product from naphthalene oil, by extracting it successively with toluene and acetone. Phenanthrene, oil and further admixtures are for the greater part removed by toluene. Carbazole dissolves in acetone. The residue of the extraction is anthracene with a purity of about 97%. From the acetone extract a mixture of carbazole and anthracene can be recovered which contains about 60 to 75% of carbazole.

It is the main object of my invention to provide a process of the kind specified by which both anthracene and carbazole are recovered as products with a purity of over 95%. A further object of my invention is to provide a simple cyclic process by which the said pure products are obtained in a continuous manner.

Further objects of my invention will appear hereinafter and in the claims hereof. According to my invention, technically pure anthracene and carbazole are prepared from crude anthracene by a process which comprises the following essential steps: (a) treating the crude product first with sufficient toluene only to extract substantially all the phenanthrene and associated impurities; (b) treating the residue from step (a) with acetone sufficient to extract substantially all the carbazole; (c) distilling acetone from the extract obtained in step (b); (d) treating the residue from step (c) with toluene; (e) partially distilling toluene from the extract obtained in step (d), and re-circulating the residual liquid into step (a); (f) collecting technically pure anthracene from the residue left in step (b); (g) collecting technically pure carbazole from the residue left in step (d).

The residue of the extraction of crude anthracene with toluene and acetone is anthracene with a purity of 96 to 98%, the residue of the second toluene extraction being carbazole with a purity of 96 to 99%. Phenanthrene, oil and other admixtures are discharged into the toluene extract of the first stage and recovered therefrom by distilling the toluene, if desired.

By using, according to my invention, the same solvent for the purification of carbazole as was used for the first treatment of the crude anthracene, a number of extra advantages are obtained. The extract of the crude carbazole contains comparatively rather large amounts of carbazole and anthracene. These amounts are now reintroduced into the process in a simple manner. At the same time other impurities in the carbazole which are soluble in toluene are recycled to the first stage, so that these impurities may be removed together with the crude phenanthrene which has only little value as it is. For the further processing of the crude phenanthrene to produce e. g., carbon black these impurities do not cause hindrance.

A second advantage of the application of toluene, acetone and toluene successively as solvents is that it is not necessary to remove the toluene completely from the residue of the first stage, for low percentages of toluene do not perceptibly interfere with the acetone extraction. After removal of the acetone from the acetone extract by distillation, this toluene is left in the precipitated crude carbazole and is received in the toluene which is to be added for the toluene extraction of this carbazole. By preference the distillation of the acetone out of the acetone extract is carried out with addition of toluene, which may be heated if desired, as a result of which the formation of crusts is avoided.

The process of my invention makes it possible to avoid technically complicated filtering or centrifuging and subsequent drying processes during the extraction, while still leaving it possible to avoid accumulation of impurities during the process or an undesired mixing of solvents. Only in the separation of the final products, anthracene and carbazole, is it necessary to use a centrifuge and a drier.

My invention will now be explained with the help of the accompanying drawings showing flow sheets illustrating different ways of carrying out the invention.

Figure 1 gives a simple flow sheet for working up anthracene. The crude anthracene is extracted with toluene in a first treatment 1. This treatment may be continuous or be carried out in a number of stages in countercurrent. The resulting extract is distilled in a treatment 6, in which, besides toluene, a mixture of phenanthrene, oil and other admixtures is obtained. This mixture may, e. g., be further processed to produce carbon black. The residue of the extraction process 1 is subsequently, likewise continuously or in a number of stages in countercurrent extracted with acetone 2. After drying the residue is anthracene with a purity of over 96%. Subsequently the acetone is distilled out of the acetone extract 3 and the resulting solid product, consisting of crude carbazole with a rather high content of anthracene is extracted with toluene 4.

The residue of this extraction, after it has been dried, is carbazole with a purity of over 97%. A large part of the toluene is distilled 5 out of the extract, which consists of toluene in which mainly anthracene and carbazole are dissolved, while the rest is introduced into the first stage of the extraction 1. This distillation is necessary because in the second extraction with toluene 4 much larger amounts of liquid have to be used than in the first extraction 1. In the first extraction 1, the impurities are removed as completely as possible with as small as possible an amount of liquid, for, the carbazole and anthracene dissolved in this liquid are removed and thus lost. In practice it has been found possible to keep these losses below 10% without using a more complicated separation system.

Figure 2:
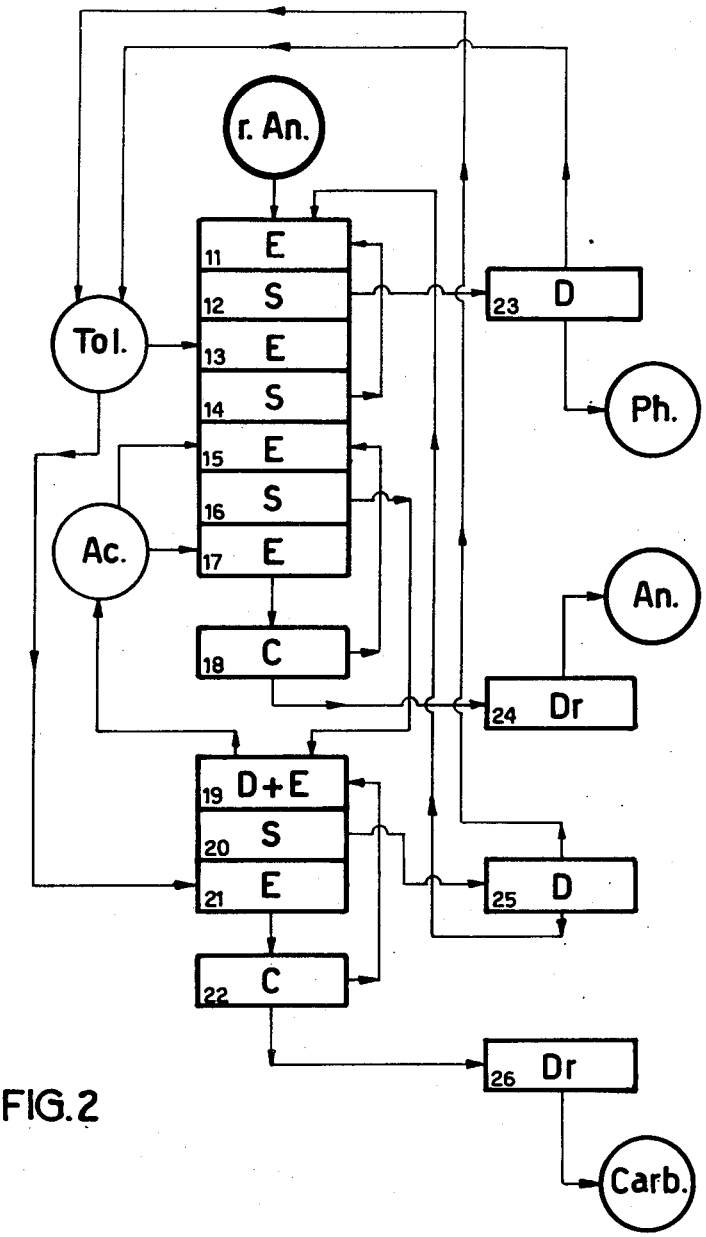

Figure 2 gives a more elaborated flow sheet.

The crude anthracene is, in this way of carrying out the invention, extracted with toluene in two stages and with acetone in two stages.

The first extraction 11 is carried out with the toluene extract of the extraction stage 13, to which moreover the partly distilled toluene extract of extraction stage 19 has been added. The extraction 11 and the following treatments 12 to 17 may all take place in the same apparatus. This may consist, e. g., of a closed vessel, which in addition to the necessary feed conduits, is provided with a stirring device, a discharge aperture through which the contents may be removed rapidly and a discharge aperture provided with a screening device in such a way that only the liquid is allowed to flow off. For, it has been found that it is not necessary in this extraction process in stages for the residue to be completely freed of solvent between the various stages. The draining of the residue appears to be sufficient, even when one passes from toluene as the solvent to acetone as the solvent. For, it appears that slight quantities of toluene cause no perceptible disturbance in the extraction with acetone.

The extract which in the separating treatment 12 is separated from the residue contains phenanthrene, oil and other impurities in a concentrated form. By a distillation process 23 the toluene is recovered. The residue is again extracted with fresh toluene 13. The solvent is separated from the residue 14 and recycled to the first extraction stage 11. Subsequently the residue is extracted with the acetone extract of the extraction stage 17 in which process 15 fresh acetone is supplied, if necessary, after which an extraction with fresh acetone is carried out 17. Subsequently the residue is separated off in a centrifuge 18 and dried 24. Now this residue consists of technically pure anthracene. The liquid from the centrifuge is used, as before stated, in extraction 15.

The solution in acetone, obtained in separation 16, is then distilled 19 with addition of hot liquid from treatment 22, which liquid is mainly composed of toluene. The acetone is removed and is subsequently again available. The carbazole crystallises in the hot toluene so that it can be separated from the solvent 20. The resulting crude carbazole is subsequently extracted with toluene 21, centrifuged out 22 and dried 26. The final product consists of carbazole with a purity of over 97%. The liquid from the centrifuge 22 is used, as before stated, in the distillation of stage 19. The liquid obtained in the separation which contains rather large amounts of anthracene and carbazole, is partially concentrated by evaporation 25 and subsequently added to the first extraction stage 11.

The addition of toluene to the distilling liquid in treatment 19 has the advantage that in this way the formation of crusts and crystal masses which are difficult to process is avoided. It has been found that even with a simple column a sharp separation between acetone and toluene can be obtained.

Sometimes it may be advantageous to cool the mixture between treatments 19 and 20 so that less carbazole is circulating. However, the fact should then be borne in mind that too much anthracene can crystallize out in the form of mixed crystals with carbazole.

Figure 3:
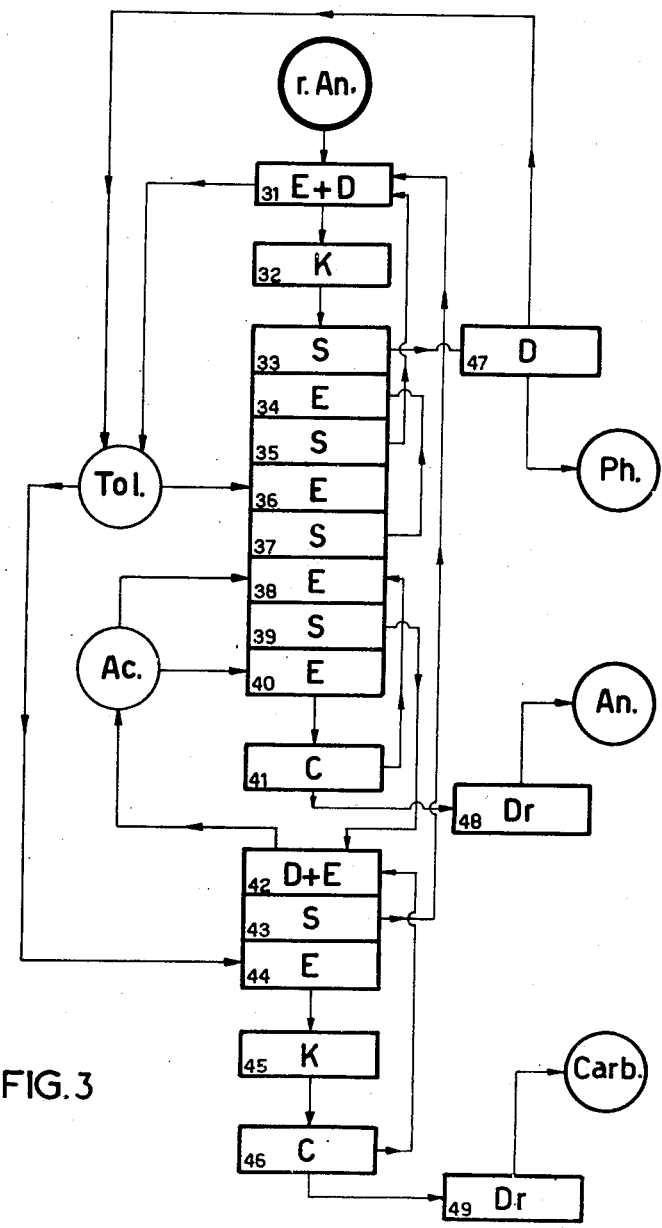

Figure 3, finally, gives a flow sheet according to which extraction also takes place in several stages. However, in this case the first extraction process is combined with the concentration by evaporation of the toluene extract from the crude carbazole. For, in treatment 31 crude anthracene is added to a distilling mixture of this toluene extract (originating from treatments 42–43) and a toluene extract from a subsequent extraction 34 of the crude anthracene. The resulting mixture is concentrated by evaporation, until an amount of liquid is left, equal to about 2 to 3 times the amount of anthracene added. Thereafter, the whole is cooled 32 and separated 33. By distillation 47 the extract is separated into toluene and a liquid mixture of phenanthrene, oil and other impurities.

The crude anthracene is subsequently extracted with fresh toluene in two stages 34 and 36 in countercurrent. The extract is passed on to distillation stage 31. Then the residue is extracted with acetone in two stages 38 and 40 in counter-current, centrifuged off 41 and dried 48, which treatments finally result in the formation of anthracene with a purity of over 96%.

Subsequently the acetone extract is distilled 42 with addition of liquid from treatment 46, which liquid consists mainly of toluene, the resulting toluene extract is introduced into the first distillation stage 31, the residue is treated with toluene 44, and the resulting mixture is cooled 45 and centrifuged 46. After drying 49 the solid substance consists of carbazole with a purity of at least 97%.

When the operation was carried out according to the flow sheet down in Figure 3, 40 kg. of anthracene (purity 97%) and 35 kg. of carbazole (purity 97.5%) were obtained per 100 kg. of crude anthracene (composition: 44% of anthracene, 37% of carbazole, remainder phenanthrene, oil, etc.), 25 kg. of a mixture consisting for a considerable part of phenanthrene being removed. 20 kg. of toluene and 10 kg. of acetone were lost in the process, mainly in the driers.

In operation 31, 400 kg. of toluene extract obtained in treatment 42 and 100 kg. obtained in treatments 34 to 36 were added per 100 kg. of mixture, 300 litres of toluene being distilled off.

In the subsequent extraction stages 34 and 36 the starting material was toluene, of which an amount of 120 litres was used. Per 100 kg. of crude anthracene about 800 litres of acetone were in circulation. 400 litres were used for the extraction of the second stage 40. For the extraction of the crude carbazole (treatments 42 to 46) use was made of about 400 litres of toluene per 100 kg. of crude anthracene.

The whole extraction may, as much as possible, be carried out at room temperature. If the operation is carried out at a higher temperature the extraction may be performed more rapidly and with the use of smaller amounts of solvent.

The extraction is preferably carried out with constant stirring.

I claim:

1. In a process for the manufacture of technically pure anthracene and carbazole from crude mixtures, containing anthracene, carbazole and phenanthrene as the principal constituents, wherein said crude mixture is first treated with toluene to extract phenanthrene, the resulting residue is next treated with acetone to extract a solution of carbazole from said residue and technically pure anthracene is collected as a residue from said acetone treatment, the improvement which comprises distilling said acetone from said solution of carbazole and subjecting the raw carbazole obtained thereby as a distillation residue to an extraction treatment with toluene and separating technically pure carbazole crystals from the toluene solution thus obtained.

2. The process of claim 1 wherein part of the toluene in the final toluene solution is removed by distillation and the remainder of the solution is added to said crude mixture.

3. The process of claim 1 wherein toluene is added to said solution of carbazole in acetone prior to said distillation whereby the distillation residue resulting therefrom comprises a mixture containing carbazole and toluene, and whereby the formation of incrustations is avoided and said acetone is rapidly removed.

References Cited in the file of this patent

UNITED STATES PATENTS

| 1,879,090 | Cislak | Sept. 27, 1932 |
| 2,622,087 | De Bruijn | Dec. 16, 1952 |
| 2,675,345 | Andrews | Apr. 13, 1954 |

FOREIGN PATENTS

| 7,868 | Great Britain | July 8, 1899 |